(12) United States Patent
Lewendon

(10) Patent No.: US 12,129,029 B2
(45) Date of Patent: Oct. 29, 2024

(54) STORE SUSPENSION LUG

(71) Applicant: L3Harris Release & Integrated Solutions Ltd, Brighton (GB)

(72) Inventor: James Lewendon, Brighton (GB)

(73) Assignee: L3Harris Release & Integrated Solutions Ltd, Brighton (GB)

( * ) Notice: Subject to any disclaimer, the term of this patent is extended or adjusted under 35 U.S.C. 154(b) by 7 days.

(21) Appl. No.: 17/860,390

(22) Filed: Jul. 8, 2022

(65) Prior Publication Data

US 2023/0015558 A1 Jan. 19, 2023

(30) Foreign Application Priority Data

Jul. 15, 2021 (GB) ...................................... 2110705

(51) Int. Cl.
*B64D 1/04* (2006.01)
*F16B 45/00* (2006.01)

(52) U.S. Cl.
CPC ................ *B64D 1/04* (2013.01); *F16B 45/00* (2013.01)

(58) Field of Classification Search
CPC .... B64D 1/02; B64D 1/04; B64D 1/00; F16B 45/00; F16B 45/002
See application file for complete search history.

(56) References Cited

U.S. PATENT DOCUMENTS

| | | | |
|---|---|---|---|
| 2,852,981 A | 9/1958 | Caya | |
| 3,379,131 A * | 4/1968 | Webb | F42B 25/00 89/1.51 |
| 4,917,526 A * | 4/1990 | Paterson | F16C 11/04 403/93 |
| 5,056,408 A | 10/1991 | Joner et al. | |
| 5,094,140 A * | 3/1992 | Williams | B64D 7/08 89/1.819 |
| 5,961,075 A * | 10/1999 | Russell, III | F42B 25/00 89/1.51 |

(Continued)

FOREIGN PATENT DOCUMENTS

| | | |
|---|---|---|
| CN | 209386908 U | 9/2019 |
| CN | 209470594 U | 10/2019 |

OTHER PUBLICATIONS

United Kingdom Patent Application No. 2110705.7, Search and Examination Report, dated Feb. 11, 2022, pp. 1-7.

(Continued)

*Primary Examiner* — Benjamin P Lee
(74) *Attorney, Agent, or Firm* — Kilpatrick Townsend & Stockton LLP

(57) ABSTRACT

A store suspension lug assembly comprises a base securable to a store and a lug portion hingedly movable between an extended position in which it is engageable by a suspension hook of a release unit and a retracted position presenting a lower aerodynamic profile. The lug portion is biased towards the retracted position. A locking mechanism has a locked state in which the lug portion is held in the extended position. The locking mechanism is releasable by action of the suspension hook on the lug portion, e.g. by the suspension hook engaging a portion of the locking mechanism as the weight of the store acts on the suspension hook via the lug portion. Engagement of the suspension hook with the lug portion may maintain the lug portion in the extended position against the bias.

21 Claims, 3 Drawing Sheets

(56) References Cited

U.S. PATENT DOCUMENTS

| | | | |
|---|---|---|---|
| 11,511,859 B2* | 11/2022 | Remy | B64D 1/06 |
| 11,718,405 B1* | 8/2023 | Pitts | B64D 7/00 244/118.1 |
| 2010/0282893 A1 | 11/2010 | Roemerman et al. | |
| 2010/0326264 A1* | 12/2010 | Roemerman | B64D 1/06 89/1.56 |

OTHER PUBLICATIONS

European Patent Application No. 22182180.4, Extended European Search Report, dated Dec. 8, 2022, 8 pages.

\* cited by examiner

STORE SUSPENSION LUG

CROSS REFERENCE TO RELATED APPLICATION

This application is related to and claims priority benefit from United Kingdom Patent Application No. 2110705.7 ("the '705.7 application"), filed on Jul. 15, 2021, entitled STORE SUSPENSION LUG. The '705.7 application is hereby incorporated in its entirety by this reference.

FIELD OF THE INVENTION

This invention concerns suspension lugs for stores (e.g. bombs or missiles) which are to be carried by and released from a parent military aircraft. In one commonplace arrangement, the store is provided with a pair of suspension lugs, and a store carriage and release unit is fixed underneath the wing (or at another suitable location) on the parent aircraft. A corresponding pair of hooks on the carriage and release unit engages the suspension lugs as the store is loaded onto (attached to) the aircraft. The hooks are then opened to disengage from the suspension lugs and release the store from the aircraft when required.

Such suspension lugs protrude from the store and contribute to the aerodynamic drag after the store has been released from the parent aircraft, when the store is in free flight, or in free fall on its way to the ground.

To minimise this drag the lug could fold back e.g. under spring action, leaving no or a reduced protrusion. However, then the un-folded lug must be retained in the erect condition against the spring action during loading onto the release unit hooks, which is problematic.

BACKGROUND

CN 209470594 U, CN 209386908 U and U.S. Pat. No. 5,056,408 A disclose self-retracting bomb suspension lugs which are linearly withdrawable into a housing under spring bias, when the weight of the bomb is released from the lug. For loading the bomb onto a suspension hook, the lug may be held in an extended position by a cocking mechanism. Loading the bomb onto the suspension hook causes the suspension lug to be pulled further outward from the housing against the spring bias, thereby releasing the cocking mechanism. Then when the bomb is released from the suspension hook, the spring bias is able to retract the suspension lug fully into the housing. However, to achieve a streamlined configuration when retracted, such linearly retractable suspension lugs are relatively intrusive as far as the store internals are concerned. The housing must be at least as deep as the height of the extended suspension hook.

More compact foldable store suspension lug arrangements are known, as shown for example in US 2010/0282893 A1. However, because the foldable store suspension lug rotates about a fixed axis, it is held in its upright or unfolded position by a manually withdrawable safety pin. (See id., e.g., FIG. 3, and paragraphs [0045] and [0046]). Such an arrangement does not on loading the store automatically set the foldable suspension lug to fold down upon release of the store. Automatically released cocking mechanisms of the kind known in relation to linearly retractable lugs cannot be used in the case of a folding lug rotating on a fixed axis. Problems can therefore arise e.g. if the safety pin is inadvertently left in place after loading the store.

SUMMARY

The present invention accordingly provides a store suspension lug assembly as defined in claim 1. With the lug portion held in the extended position by the locking mechanism, the store may be easily loaded onto the suspension hook of the release unit. The suspension hook can then act on the lug portion to set the locking mechanism to the released state in which the lug portion is movable relative to the base. Then when the suspension hook is disengaged from the lug portion as the store is released from the release unit, the mechanical bias moves the lug portion to the retracted position, so as to reduce aerodynamic drag on the released store. Thus, no separate step is required by the ground crew to release the locking mechanism, reducing the possibility of incorrect suspension lug operation due to human error.

For example, at least a part of the locking mechanism may be arranged in or on the lug portion, so that the weight of the store acting on the suspension hook via the lug portion also acts to set the locking mechanism to the released state. Then when the suspension hook is disengaged from the lug portion as the store is released from the release unit, the lug portion will move automatically to the retracted position under the mechanical bias.

After the locking mechanism is set to the released state and until the suspension hook is disengaged from the lug portion, the lug portion may be maintained in the extended position against the mechanical bias in a simple manner by its engagement with the suspension hook.

The hinged coupling between the base and the lug portion provides for a compact overall structure and low aerodynamic profile when the lug portion is in the retracted position.

The locking mechanism may comprise a locking member slidably received within the lug portion. For example, the locking member may be slidable transversely of a hinge axis of the hinged coupling. In this way the locking member may easily engage with and disengage from other parts of the locking mechanism to hold the lug portion in its extended position or release the lug portion for movement to its retracted position.

To allow the locking mechanism to be acted on by the suspension hook, the locking member may extend across a portal in the lug portion configured for reception of the suspension hook. The locking member may be generally U-shaped, for example. The base of the U may extend across the portal of the lug portion bordering or close to a top edge thereof, and the legs of the U may extend along sides of the lug portion, e.g. bordering the portal. For example, the lug portion may also be generally U-shaped.

The locking mechanism may comprise a keeper coupled to the base and mechanically biased from an active position in which it is lockingly engageable by the locking member to set the locking mechanism into the locked state, to an inoperative position in which the keeper is not lockingly engageable by the locking member. Thus, when the locking member is disengaged from the keeper, the keeper moves to the inoperative position under its mechanical bias. The locking member is thereby prevented from re-engaging the keeper, so that the locking mechanism remains in the released state and the lug portion can move towards the retracted position under its mechanical bias.

The keeper may comprise a cam surface engageable by the locking member so as to move the keeper from the inoperative position to the active position. For example, the locking member may so engage the cam surface to cause such movement of the keeper as the lug portion is moved from the retracted position to the extended position. Thus the locking mechanism may be automatically set to the locked state as the lug portion is moved from the retracted position to the extended position. The keeper may for example be movable longitudinally with respect to a hinge axis of the lug portion.

The keeper may comprise a second active position in which it is lockingly engageable by the locking member to hold the lug portion in the retracted position. The second active position of the keeper may correspond to the inoperative position relative to the base, but with the locking member carried by the lug portion as it moves to the retracted position, so as to lockingly re-engage the keeper. The lug portion may thus be held securely in the retracted position until the store is ready to be loaded onto the suspension hook.

The locking member may be mechanically biased towards the keeper. Hence the locking member can lockingly engage the keeper in the second active position even if the locking member is generally horizontal so that it is not biased towards the keeper under its own weight. Mechanically biasing the locking member in this way can also assist its locking engagement with the keeper in the first active position.

BRIEF DESCRIPTION OF THE DRAWINGS

The above and other optional features and advantages of the invention are further elucidated by the following description of an illustrative embodiment of the invention made with reference to the drawings, in which.

DETAILED DESCRIPTION

Figure 1:
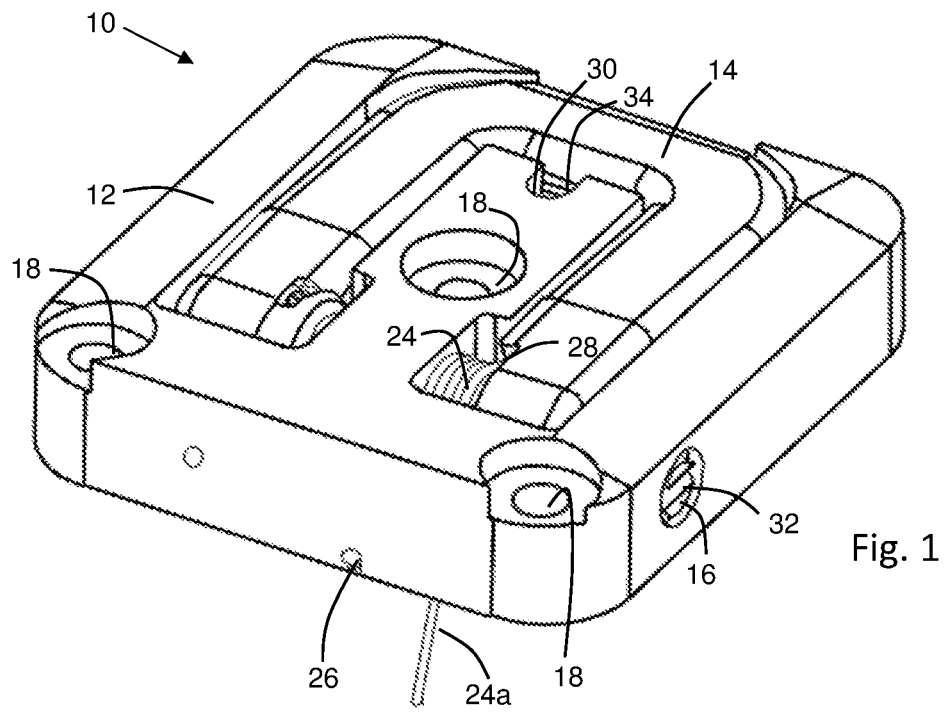
FIG. 1 shows a store suspension lug assembly embodying the present invention, with the lug portion folded down into the retracted position.
Figure 2:
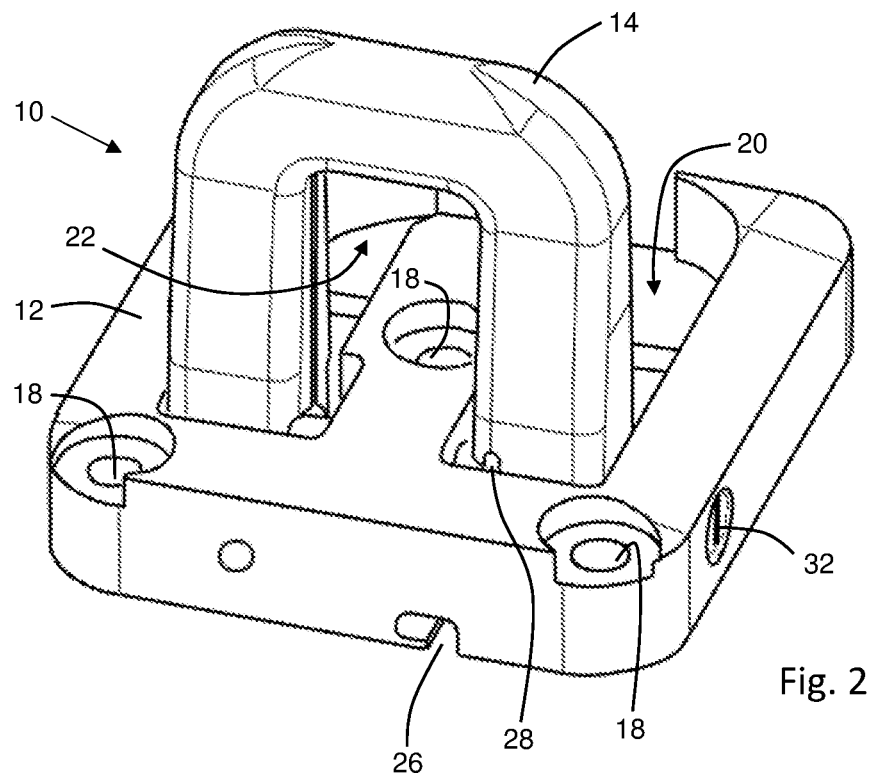
FIG. 2 generally corresponds to FIG. 1, except that certain parts are omitted for simplicity and the lug portion is shown hinged upwardly to the extended position in which it is generally upright.

Referring firstly to FIGS. 1 and 2, the illustrative store suspension lug assembly 10 comprises a base 12 and a looped lug portion 14 hingedly coupled to the base 12 by a hinge pin 16. The base 12 is securable to a suitable strong point on the store (not shown), positioned so that the suspension lug assembly 10 will be appropriately aligned with the corresponding suspension hook of the parent aircraft release unit (not shown). The base 12 is provided with three countersunk bolt holes 18 for this purpose. The hinge pin 16 is a press fit in the lug portion 14 and a close rotating/sliding fit in the base 12. Therefore the lug portion 14 and hinge pin 16 can be rotated as a unit relative to the base 12, between a retracted position in which the lug portion 14 lies generally horizontally in a pocket 20 within the base 12, and an extended position in which the lug portion 14 stands up generally vertically from the base 12. In this extended position a portal 22 in the lug portion 14 is accessible for reception of the release unit hook (not shown), for suspending the store from the parent aircraft.

A torsion spring 24 is fitted about the hinge pin 16 and has a first end 24a braced against the store and/or received in a retaining slot 26 in the base 12. A second end of the torsion spring 24 (not visible in FIG. 1) is braced against the lug portion 14 in a slot 28, so as to mechanically bias the lug portion towards and into the "down" or retracted position within the pocket 20. The torsion spring 24 is omitted from FIG. 2 for simplicity.

Prior to fitment to the release unit of the parent aircraft, stores can be delivered and handled with the lug portion 14 locked in the "down" or retracted position. This helps to prevent damage to the lug portion 14 and its environment by any accidental knocks. To prepare the store for fitment to the release unit hook via the suspension lug assembly 10, a flat bladed tool is inserted into an access notch 30 to disengage a locking mechanism as further explained later below. Another tool can then be inserted into a tool interface 32 formed in or on one end of the hinge pin 16 and used to rotate the lug portion 14 up into the extended position as shown in FIG. 2, against the bias of the spring 24. Although the drawings show a flat blade screwdriver slot, any suitable tool interface could be provided as desired (hex wrench, crosshead, etc). The locking mechanism also ensures that the lug portion 14 will remain "up" once fully extended, as further explained below.

Figure 3:
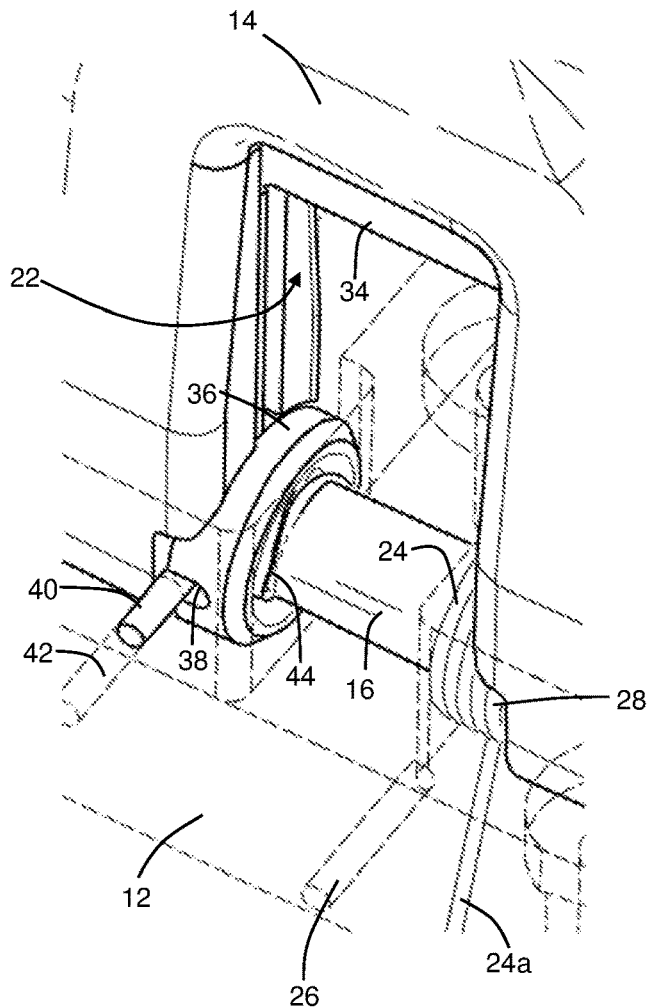
FIG. 3 is a partly "see-through" view corresponding to a portion of FIG. 2, and shows details of the locking mechanism, with the keeper in its active position and engaged by the locking member, to hold the lug portion upright against its mechanical bias.
Figure 4:
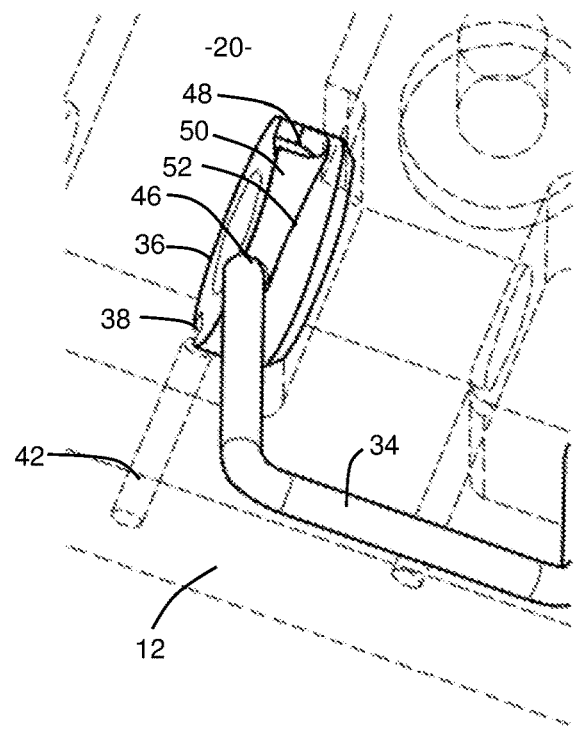
FIG. 4 corresponds to FIG. 3, but viewed from a direction looking down onto the locking member from above, and with certain parts omitted for clarity.

Referring now to FIGS. 3-6, the locking mechanism comprises a locking member 34 in the form of a U shaped locking bar slidably received within the lug portion 14. In FIG. 4, the lug portion 14 and hinge pin 16 are omitted, so that the U-shaped locking bar 34 is more clearly visible (viewed from above, in a position in which the lug portion 14, if it were present, would be in the "up" position). The locking member/locking bar 34 is slidable in the lug portion 14 in a direction radially towards or away from the hinge pin 16. The locking mechanism further comprises a keeper 36 mechanically coupled to the base 12. In the illustrative example, the keeper is provided in the form of a locking disc 36 which is mechanically coupled to the base by being axially slidably received on the hinge pin 16. The keeper/locking disc 36 has an axially extending guide slot 38. A guide pin 40 has a first end fixedly received in a drilling 42 in the base 12 and a second end freely projecting from the drilling 42, into the guide slot 38. The keeper/locking disc 36 is thereby guided for axial movement on the hinge pin 16, without rotation relative to the base 12. The keeper/locking disc 36 is mechanically biased outwards, towards the left hand end of the locking pin 16 as shown in FIG. 3, by a wavy spring 44. This spring is received in an annular recess formed in the body of the keeper/locking disc 36 and is braced between the bottom of the annular recess and the base 12.

FIGS. 3 and 4 show the locking mechanism in the locked state, in which the lug portion 14 is held in the extended or "up" position relative to the base 12. This state arises because an end of the locking member/locking bar 34 enters into a first receiving hole 46 in the keeper/locking disc 36 (see FIG. 4) in a manner further explained later below. The lug portion 14 and hinge pin 16 are thereby prevented from rotating relative to the keeper/locking disc 36 and base 12. This keeps the lug portion 14 in the upright, extended position, against the mechanical bias of the torsion spring 24, for loading of the store onto the release unit hook.

As best seen in FIG. 3, a base part of the U-shaped locking bar 34 forming the locking member extends across the top edge region of the portal 22 in the lug portion 14. A leaf spring (not visible in the drawings) is interposed between this base part and the bottom of a corresponding reception recess in the adjacent part of the lug portion 14. The leaf spring biases the locking bar 34 towards the hinge pin 16 and therefore together with the weight of the locking bar 34, pushes the end of the locking bar 34 into the first receiving hole 46 when the keeper/locking disc 36 is in its innermost, active position as shown in FIGS. 3 and 4. As the lug portion 14 is brought into engagement with the release unit suspension hook in the portal 22, the weight of the store is reacted through the suspension hook and acts on the locking bar 34 to retract it into the reception recess in the lug portion 14. The end of the locking bar 34 is thereby withdrawn from the first receiving hole 46.

Figure 5:
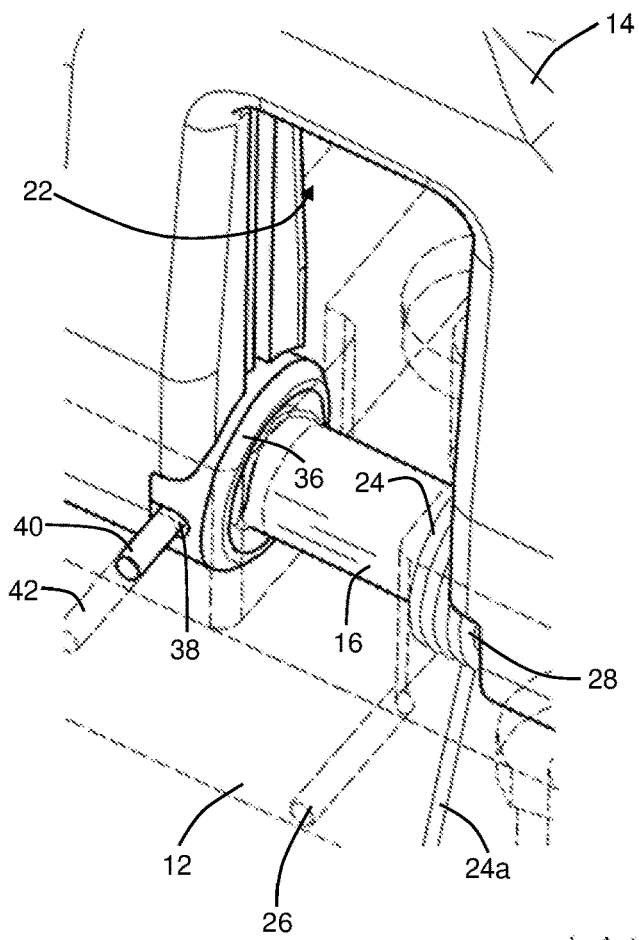
FIG. 5 corresponds to FIG. 3, but shows the locking member disengaged from the keeper and the keeper moved to the inoperative position.

The keeper/locking disc 36 then moves outward under the force of the wavy spring 44, obscuring the first receiving hole 46, and hence preventing re-engagement of the locking bar 34 end. This configuration is shown in FIG. 5. At this point, the lug portion 14 is prevented from rotating under the bias of the torsion spring 24 by presence of the release unit suspension hook.

Figure 6:
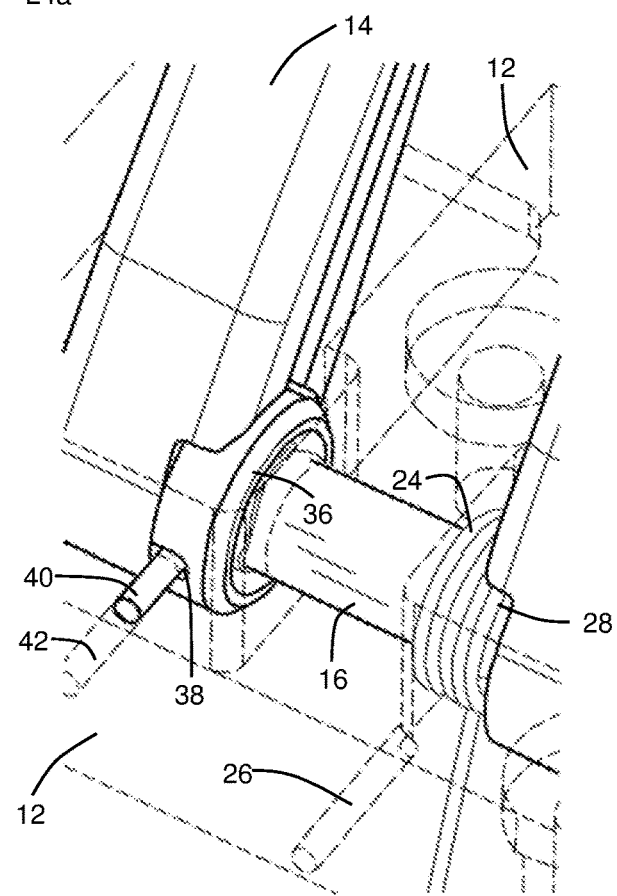
FIG. 6 corresponds to FIG. 5, but shows the lug portion rotated downwardly part-way towards the retracted position, the locking member (not clearly visible in this Figure) being carried therewith for engagement with the keeper in the second active position.

The weight of the store acting on the lug portion 14 is removed at ejection. But the end of the locking bar cannot re-engage with the keeper/locking disc 36, which has moved axially outward to obscure the first receiving hole 46. The keeper/locking disc 36 is thus in the inoperative position, in which it is not lockingly engageable by the locking member/locking bar 34 when the lug portion 14 is in the "up" or extended position. At store ejection, the suspension hook is also withdrawn from the lug portal 22. This leaves the torsion spring 24 free to rotate the lug portion 14 (and the stowed locking bar 34) towards the down or retracted position. FIG. 6 shows such rotation in progress. Thus upon opening (release) of the release unit suspension hook, the lug portion 14 folds back without the locking member/locking bar 34 reengaging, resulting in a retracted folded lug portion 14 and a smooth aerodynamic profile to the store.

Returning to FIG. 4, as the lug portion 14 (not shown in this Figure) comes down into the pocket 20, the end of the locking bar aligns with a second receiving hole 48 in the keeper/locking disc 36. The locking bar 34 is biased into engagement with this second receiving hole 48 by the unseen leaf spring in the reception recess of the lug portion 14. The lug portion 14 is thereby locked in the fully retracted or "down" position. Hence the outward, inoperative position of the keeper/locking disc 36 relative to the base 12 when the lug portion 14 is in its extended position also corresponds to a second active position of the keeper/locking disc 36 when the lug portion 14 is in its retracted position.

Referring still mainly to FIG. 4, a portion 50 of the outer circumferential surface of the keeper/locking disc 36 between the first 46 and second 48 receiving holes, is recessed to define an axially outwardly facing, helical cam surface 52. When the end of the locking member/locking bar 34 is withdrawn from the second receiving hole 48 (e.g. by inserting a flat-bladed tool into the access notch 30 as described above, and displacing the locking bar 34 against the action of the unseen leaf spring—see FIG. 1), this end still projects slightly from the lug portion 14, so as to engage the cam surface 52. As the lug portion 14 is raised towards the extended position, the projecting end of the locking member/locking bar 34 therefore moves along the cam surface 52 and pushes the keeper/locking disc 36 axially inwards along the hinge pin 16, against the action of the wavy spring 44. When the lug portion 14 reaches its fully extended position, the keeper/locking disc 36 is therefore set/reset to its active position and the end of the locking member/locking bar 34 is able to drop/snap into the first receiving hole 46 under its own weight and/or under the action of the unseen leaf spring (this condition of the locking mechanism being shown in FIG. 3).

The lug assembly 10 may be made from any suitable materials. For example, the lug portion 14 may be made from 17-4 stainless steel. The hinge pin 16 may be made from S99 stainless steel. The base 12 can be of 2014-T6 aluminium. The keeper/locking disc 36 and the locking member/locking bar 34 may similarly be made from suitable grades of stainless steel, or any other suitable materials.

That which is claimed is:

1. A store suspension lug assembly comprising a base securable to or incorporated in a store and a lug portion coupled to the base so as to be movable between an extended position in which the lug portion is engageable by a suspension hook of a release unit and a retracted position presenting a lower aerodynamic profile than in the extended position; the lug portion being mechanically biased towards the retracted position; the store suspension lug assembly further comprising a locking mechanism having a locked state in which the lug portion is held in the extended position; wherein the locking mechanism is configured so that it is movable from the locked state to a released state by reaction of the suspension hook on the lug portion in opposition to the weight of the store supported by the lug portion and wherein the coupling between the base and the lug portion comprises a hinged coupling; wherein the locking mechanism comprises a locking member slidably arranged in or on the lug portion and extending across a portal in the lug portion configured for reception of the suspension hook.

2. The store suspension lug assembly of claim 1, in which the locking member is arranged in or on the lug portion so that the weight of the store acting on the suspension hook via the lug portion also acts to set the locking mechanism to the released state.

3. The store suspension lug assembly of claim 1, in which the lug portion is maintained in the extended position against the mechanical bias by its engagement with the suspension hook.

4. The store suspension lug assembly of claim 1, in which the locking member is slidable transversely of a hinge axis of the hinged coupling.

5. The store suspension lug assembly of claim 1, in which the locking member is U-shaped.

6. The store suspension lug assembly of claim 1, in which the locking mechanism comprises a keeper coupled to the base and mechanically biased from an active position in which it is lockingly engageable by the locking member to set the locking mechanism into the locked state, to an inoperative position in which the keeper is not lockingly engageable by the locking member.

7. The store suspension lug assembly of claim 6, in which the keeper comprises a cam surface engageable by the locking member so as to move the keeper from the inoperative position to the active position.

8. The store suspension lug assembly of claim 7, in which the locking member so engages the cam surface to cause such movement of the keeper as the lug portion is moved from the retracted position to the extended position.

9. The store suspension lug assembly of claim 7, in which the keeper is movable longitudinally with respect to a hinge axis of the lug portion.

10. The store suspension lug assembly of claim 6, in which the keeper comprises a second active position in which it is lockingly engageable by the locking member to hold the lug portion in the retracted position.

11. The store suspension lug assembly of claim 10, in which the second active position corresponds to the inoperative position relative to the base and wherein the locking member is carried by the lug portion as it moves to the retracted position, so as to lockingly re-engage the keeper.

12. The store suspension lug assembly of claim 6, in which the locking member is mechanically biased towards the keeper.

13. The store suspension lug assembly of claim 1, in which the lug portion is U-shaped.

14. A store suspension lug assembly comprising a base securable to or incorporated in a store and a lug portion coupled to the base so as to be movable between an extended position in which the lug portion is engageable by a suspension hook of a release unit and a retracted position presenting a lower aerodynamic profile than in the extended position; the lug portion being mechanically biased towards the retracted position; the store suspension lug assembly further comprising a locking mechanism having a locked state in which the lug portion is held in the extended position; wherein the locking mechanism is configured so that it is movable from the locked state to a released state by reaction of the suspension hook on the lug portion in opposition to the weight of the store supported by the lug portion and wherein the coupling between the base and the lug portion comprises a hinged coupling; wherein the locking mechanism comprises a locking member slidably received within the lug portion, and a keeper coupled to the base and mechanically biased from an active position in which it is lockingly engageable by the locking member to set the locking mechanism into the locked state, to an inoperative position in which the keeper is not lockingly engageable by the locking member.

15. The store suspension lug assembly of claim 14, in which the keeper comprises a cam surface engageable by the locking member so as to move the keeper from the inoperative position to the active position.

16. The store suspension lug assembly of claim 15, in which the locking member so engages the cam surface to cause such movement of the keeper as the lug portion is moved from the retracted position to the extended position.

17. The store suspension lug assembly of claim 15, in which the keeper is movable longitudinally with respect to a hinge axis of the lug portion.

18. The store suspension lug assembly of claim 14, in which the keeper comprises a second active position in which it is lockingly engageable by the locking member to hold the lug portion in the retracted position.

19. The store suspension lug assembly of claim 18, in which the second active position corresponds to the inoperative position relative to the base and wherein the locking member is carried by the lug portion as it moves to the retracted position, so as to lockingly re-engage the keeper.

20. The store suspension lug assembly of claim 14, in which the locking member is mechanically biased towards the keeper.

21. The store suspension lug assembly of claim 6, in which the lug portion is U-shaped.

* * * * *